United States Patent [19]

Migliori et al.

[11] Patent Number: 4,577,414

[45] Date of Patent: Mar. 25, 1986

[54] REMOTELY READABLE FIBER OPTIC COMPASS

[75] Inventors: Albert Migliori, Santa Fe; Gregory W. Swift, Los Alamos, both of N. Mex.; Steven L. Garrett, Pebble Beach, Calif.

[73] Assignee: The United States of America as represented by the United States Department of Energy, Washington, D.C.

[21] Appl. No.: 728,976

[22] Filed: Apr. 30, 1985

[51] Int. Cl.[4] ............................................. G01C 17/26
[52] U.S. Cl. .................................... 33/363 K; 33/327; 33/364; 33/317 R
[58] Field of Search ................. 33/363 K, 363 R, 312, 33/316, 317 R, 319, 327, 346, 364

[56] References Cited

U.S. PATENT DOCUMENTS

| | | | |
|---|---|---|---|
| 3,888,016 | 6/1975 | Fowler | 33/363 K |
| 3,927,474 | 12/1975 | Lapeyre et al. | 33/363 K |
| 4,047,168 | 9/1977 | Fowler | 33/363 K |
| 4,117,602 | 10/1978 | Lapeyre | 33/363 K |
| 4,446,729 | 5/1984 | Watson, III | 33/363 K |

Primary Examiner—Willis Little
Attorney, Agent, or Firm—William A. Eklund; Paul D. Gaetjens; Judson R. Hightower

[57] ABSTRACT

A remotely readable fiber optic compass. A sheet polarizer is affixed to a magnet rotatably mounted in a compass body, such that the polarizer rotates with the magnet. The optical axis of the sheet polarizer is preferably aligned with the north-south axis of the magnet. A single excitation light beam is divided into four identical beams, two of which are passed through the sheet polarizer and through two fixed polarizing sheets which have their optical axes at right angles to one another. The angle of the compass magnet with respect to a fixed axis of the compass body can be determined by measuring the ratio of the intensities of the two light beams. The remaining ambiguity as to which of the four possible quadrants the magnet is pointing to is resolved by the second pair of light beams, which are passed through the sheet polarizer at positions which are transected by two semicircular opaque strips formed on the sheet polarizer. The incoming excitation beam and the four return beams are communicated by means of optical fibers, giving a remotely readable compass which has no electrical parts.

8 Claims, 5 Drawing Figures

REMOTELY READABLE FIBER OPTIC COMPASS

This invention is the result of a contract with the Department of Energy (Contract No. W-7405-ENG-36).

BACKGROUND OF THE INVENTION

The invention described herein is generally related to magnetic compasses. More particularly, this invention is related to remotely readable magnetic compasses.

In various applications there is a need for a directional compass which can be read from a remote location. For example, in the operation of remotely controlled submersible marine vehicles it is desirable to monitor the geographic orientation of the vehicle by means of a remotely readable compass located onboard the vehicle. Similarly, in oil and gas field well logging operations it is sometimes necessary to monitor the geographic orientation of a tool or down-hole instrumentation package. Remotely readable compasses are also useful in towed undersea hydrophone arrays used in marine geophysical research, in sonobuoys used in naval operations, and in remotely controlled airborne meteorological instruments.

Although it is considered to be a straightforward matter to design a remotely readable compass using various well-known electronic transducers and the like, there is a need in some applications for simpler yet more reliable assemblies. For example, there is a need in some applications, particularly in the undersea applications noted above, for a remotely readable compass which does not require a battery or other independent power supply, and which is free of other electronic components so as to be relatively immune to the effects of corrosion and electromagnetic interference.

Further, remotely controlled instrumentation packages are increasingly being connected to remote stations by means of optical fibers, which are light in weight, inexpensive, and less susceptible to the effects of salt water or electrical interference. As optical fibers become increasingly prevalent in instrumentation packages, it becomes increasingly desirable to eliminate electrical wires and cables altogether, so that communication can be simplified by the use of single multi-strand optical fiber cables.

SUMMARY OF THE INVENTION

Accordingly, it is an object and purpose of the present invention to provide an improved remotely readable magnetic compass.

It is also an object of the present invention to provide a remotely readable magnetic compass which contains no electrical components.

It is another object of the present invention to provide a remotely readable magnetic compass wherein compass orientation information is both detected and communicated by means of light beams transmitted through optical fibers.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purpose of the present invention as embodied and broadly described herein, the present invention provides a remotely readable compass comprising a magnet which is rotatably mounted in a compass body so as to be freely rotatable with respect to the compass body. The compass further comprises a rotatable sheet polarizer which is affixed to the magnet so as to be rotatable with the magnet with respect to the compass body about a common axis of rotation. The compass further comprises first and second excitation optical fibers which are affixed to the compass body and which terminate adjacent the rotatable sheet polarizer so as to direct light beams propagated through the fibers onto the rotatable sheet polarizer. There are also first and second return optical fibers which are affixed to the compass body and which are positioned respectively opposite the rotatable sheet polarizer from the first and second excitation fibers, such that the return fibers receive light which is emitted from the excitation fibers and transmitted through the rotatable sheet polarizer. The compass further includes first and second fixed sheet polarizers. The first fixed sheet polarizer is affixed to the compass body so as to be optically interposed between the first excitation fiber and the first return fiber, and the second fixed sheet polarizer is affixed to the compass body so as to be interposed between the second excitation fiber and the second return fiber. The fixed sheet polarizers have optical axes which are oriented orthogonally with respect to one another. In operation, light is emitted from the excitation fibers and transmitted through the fixed sheet polarizers and the rotatable sheet polarizer, whereupon the light is attenuated to varying degrees depending upon the orientation of the rotatable sheet polarizer with respect to the two fixed sheet polarizers. The attenuated beams are received in the return fibers. By measuring the ratio of the intensities of the light beams in the two return fibers, the angular orientation of the magnet with respect to the compass body may be determined.

The compass may further include first and second semicircular opaque strips formed on the sheet polarizer. Each of the opaque strips is geometrically centered on the axis of rotation of the rotatable sheet polarizer. The strips are disposed at different radii from the axis of rotation of the rotatable sheet polarizer. Further, the opaque strips each extend through a circumferential angle of approximately 180°, and are offset from one another circumferentially by an angle of approximately 90°. A pair of third and fourth excitation optical fibers are affixed to the compass body and terminate adjacent the rotatable sheet polarizer so as to direct light beams emitted therefrom onto the sheet polarizer at radii which correspond respectively to the radii of the first and second opaque strips. There are also third and fourth return optical fibers affixed to the compass body opposite the rotatable sheet polarizer from the third and fourth excitation fibers, respectively. The return fibers are positioned so as to receive light emitted from the third and fourth excitation fibers and transmitted through the sheet polarizer. The rotatable sheet polarizer either transmits or occludes light emitted from the third and fourth excitation fibers, depending upon the orientation of the rotatable sheet polarizer and the magnet with respect to the compass body. By determining the transmission or occlusion of light emitted by the third and fourth excitation fibers, the quadrant in which the magnet and the rotatable sheet polarizer are oriented may be unequivocally determined. Thus, by measuring the ratio of the intensity of the light beams received in the first and second return fibers, and by further determining the occlusion or transmission of the light beams emitted by the third and fourth excitation fibers, an unequivocal determination can be made of the direction in which the compass body is pointing.

In a preferred embodiment of the invention, the magnet and the rotatable sheet polarizer are mounted in a gimbal arrangement in a liquid filled case, whereby the magnet and the rotatable sheet polarizer are maintained in a horizontal position and accommodate modest deviations in the orientation of the case from an upright position. The light beams in the four excitation fibers may be generated by means of a single light beam transmitted through a primary excitation fiber, by means of a set of three evanescent wave couplers which are suitably disposed so as to divide a single light beam in the primary excitation fiber into four substantially equal light beams for transmission through the four excitation fibers.

These and other aspects of the present invention will become more apparent upon consideration of the accompanying drawings and the following detailed description of a preferred embodiment.

BRIEF DESCRIPTION OF THE DRAWINGS

The accompanying drawings, which are incorporated in and form a part of the specification, illustrate a preferred embodiment of the present invention and, together with the description, serve to explain the principles of the invention. In the drawings.

DETAILED DESCRIPTION OF THE INVENTION

A preferred embodiment of the fiber optic compass of the present invention is shown in FIGS. 1 through 4. The particular embodiment illustrated in the Figures and described below is particularly adapted for use in undersea applications, for example, in submersible vehicles or in sonobuoys.

Figure 1:
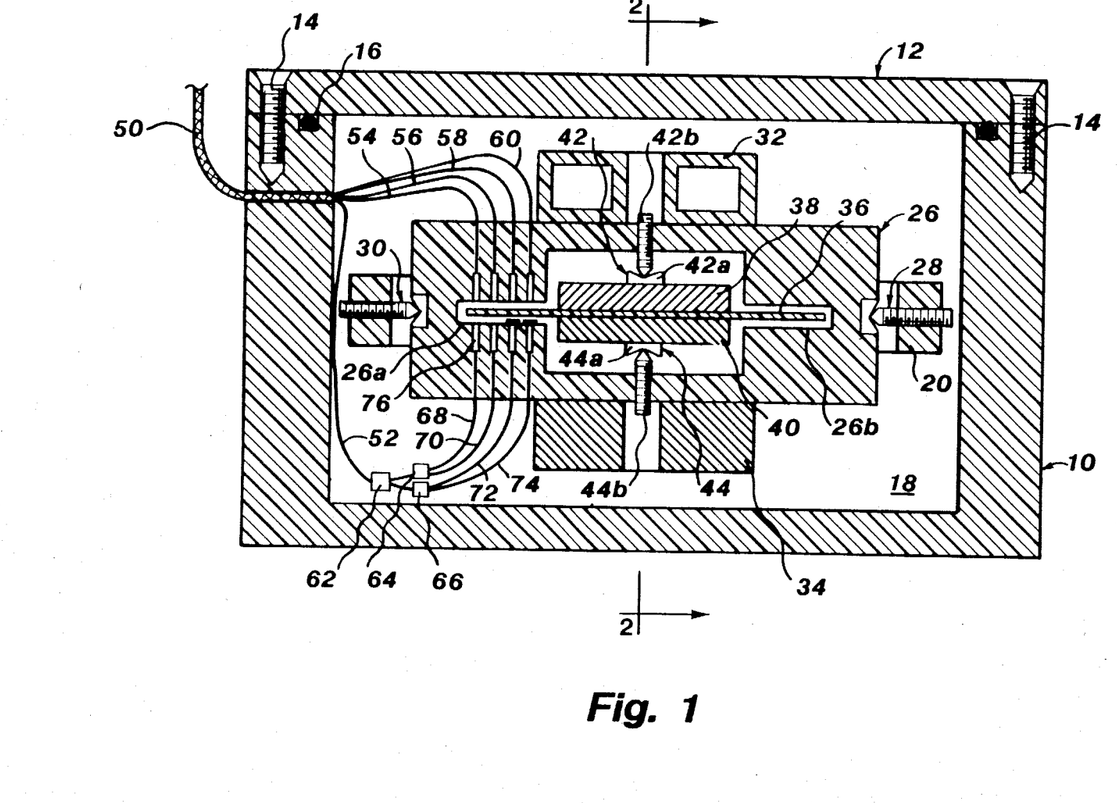
FIG. 1 is a side view in cross section of a preferred embodiment of the fiber optic compass of the present invention.
Figure 2:
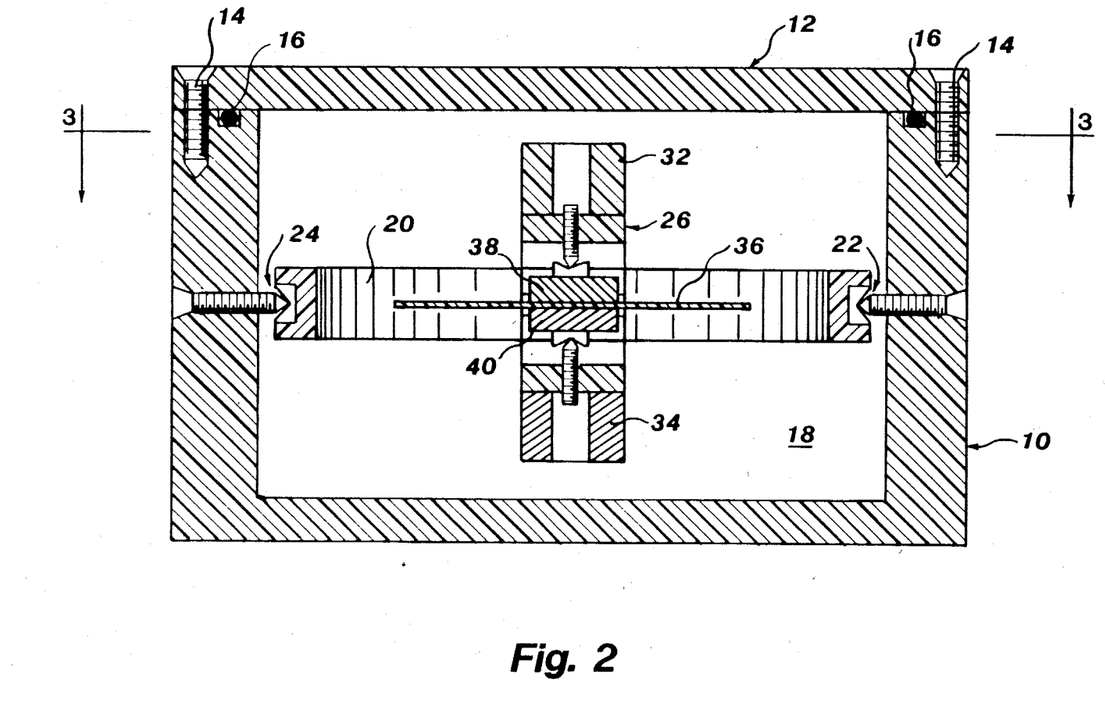
FIG. 2 is an end view in cross section of the compass shown in FIG. 1, taken along section line 2—2 of FIG. 1.
Figure 3:
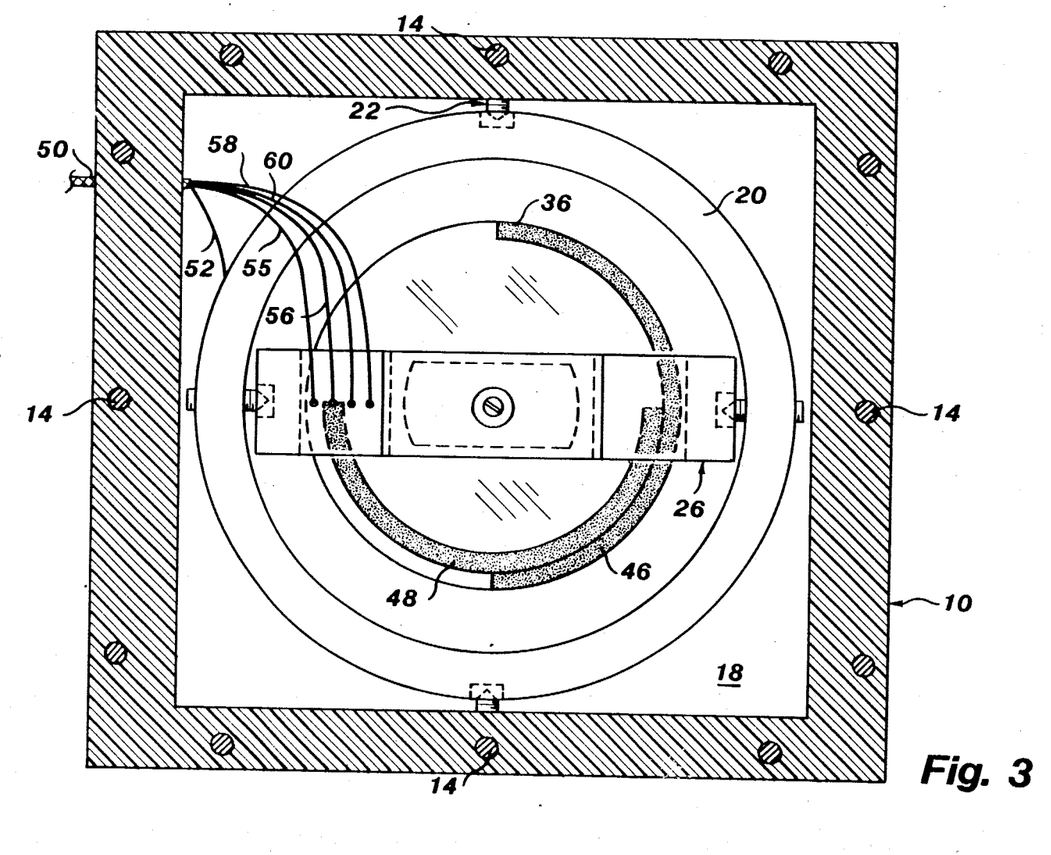
FIG. 3 is a plan view in cross section of the compass shown in FIGS. 1 and 2, taken along section line 3—3 of FIG. 2.

The compass includes a square case 10 made of suitable polymeric material. A square cover plate 12 is affixed to the open top of the case 10 by means of screws 14 and is sealed by means of an O-ring 16. The case is filled with a suitable liquid 18, for example, silicone oil, which functions as a damping medium for the movable magnetic element of the compass, described below, and which also enables the case 10 to withstand high pressures in an undersea environment.

A circular outer gimbal ring 20 is pivotably attached to opposite side walls of the case 10 by means of two jewel bearing assemblies 22 and 24 (FIG. 2), such that the ring 20 can rotate about the axis of rotation passing through the bearing assemblies 22 and 24. Pivotably attached to the inside of the outer gimbal ring 20 is an inner gimbal 26, which is attached to the outer ring 20 by means of two jewel bearing assemblies 28 and 30.

The bearing assemblies 28 and 30 are positioned on the ring 20 so as to define an axis of rotation which is orthogonal to the axis of rotation defined by the jewel bearing assemblies 22 and 24, such that the inner gimbal 26 is rotatable in two degrees of freedom with respect to the case 10. Both the inner gimbal 26 and the outer gimbal 20 are formed of suitable polymeric materials so as to be neutrally buoyant in the damping liquid 18. Affixed to the upper surface of the inner gimbal 26 is a float 32, and affixed to the lower surface of the inner gimbal 26 is a counterweight 34. This arrangement results in the inner gimbal seeking to maintain a level of orientation, despite deviations in the orientation of the case 10 of as much as approximately 20° from the vertical.

The rotatable magnetic element of the compass includes a rotatable sheet polarizer which consists of a rigid circular disk 36. The disk 36 is rotatably mounted in a central opening in the inner gimbal 26. Affixed to the upper and lower surfaces of the disk 36 are bar magnets 38 and 40, respectively. The bar magnets 38 and 40 are oriented such that their north-south axes are parallel to one another and both extend in the same direction, so that the two magnets effectively function as a single bar magnet in the ordinary manner of a simple compass. The disk 36 and its magnets 38 and 40 are rotatably mounted in an opening in the inner gimbal 26 by means of upper and lower jewel bearing assemblies 42 and 44, respectively. More specifically, the bearing assembly 42 includes a conical bearing cup 42a which is affixed to the upper bar magnet 38 and which is centered on the center of the disk 36; and an adjustable threaded jewel bearing pin 42b which extends from a threaded bore in the upper surface of the inner gimbal 26. Likewise, the lower bearing assembly 44 is also centered on the center of the disk 36 and includes a bearing cup 44a and an associated jewel bearing pin 44b. The other jewel bearing assemblies 22, 24, 28 and 30, described above, are constructed in essentially the same fashion.

The disk 36 is made of a light polarizing material, for example, the sheet polarizer sold by Polaroid Corporation under its trademark Polaroid. The magnets 38 and 40 are oriented on the disk so that the optical axis of the polarizing disk 36 is parallel to the parallel north-south axes of the magnets. The diameter of the disk 36 is significantly larger than the length of the magnets 38 and 40. The outer portion of the disk passes through a pair of narrow, horizontal transverse slots 26a and 26b formed in the inner gimbal 26.

The outer portion of the disk 36 includes first and second opaque strips 46 and 48. Each strip is semicircular and extends exactly half way around the disk, that is, through an arc of 180° around the disk. The strips 46 and 48 are radially spaced from one another but are concentric with one another and are each centered on the geometric center of the disk 36. That is, the strips 46 and 48 are positioned at different radii on the disk, with the strip 46 being positioned adjacent the outer periphery of the disk, and the second strip 48 being positioned radially inward from the periphery of the disk. The strips may be made of any coating or other material which is substantially opaque to light.

Further, the strips are offset circumferentially from one another by 90°. More specifically, the first strip 46 terminates at ends which lie on a line that passes through the center of the disk and which is orthogonal to the north-south axis of the magnets 38 and 40, and which is also orthogonal to the optical axis of the polarizing disk 36. The second strip 48 terminates at ends which lie on a line that passes through the center of the disk and which is parallel to both the north-south axis of the magnets and the optical axis of the disk.

Figure 4:
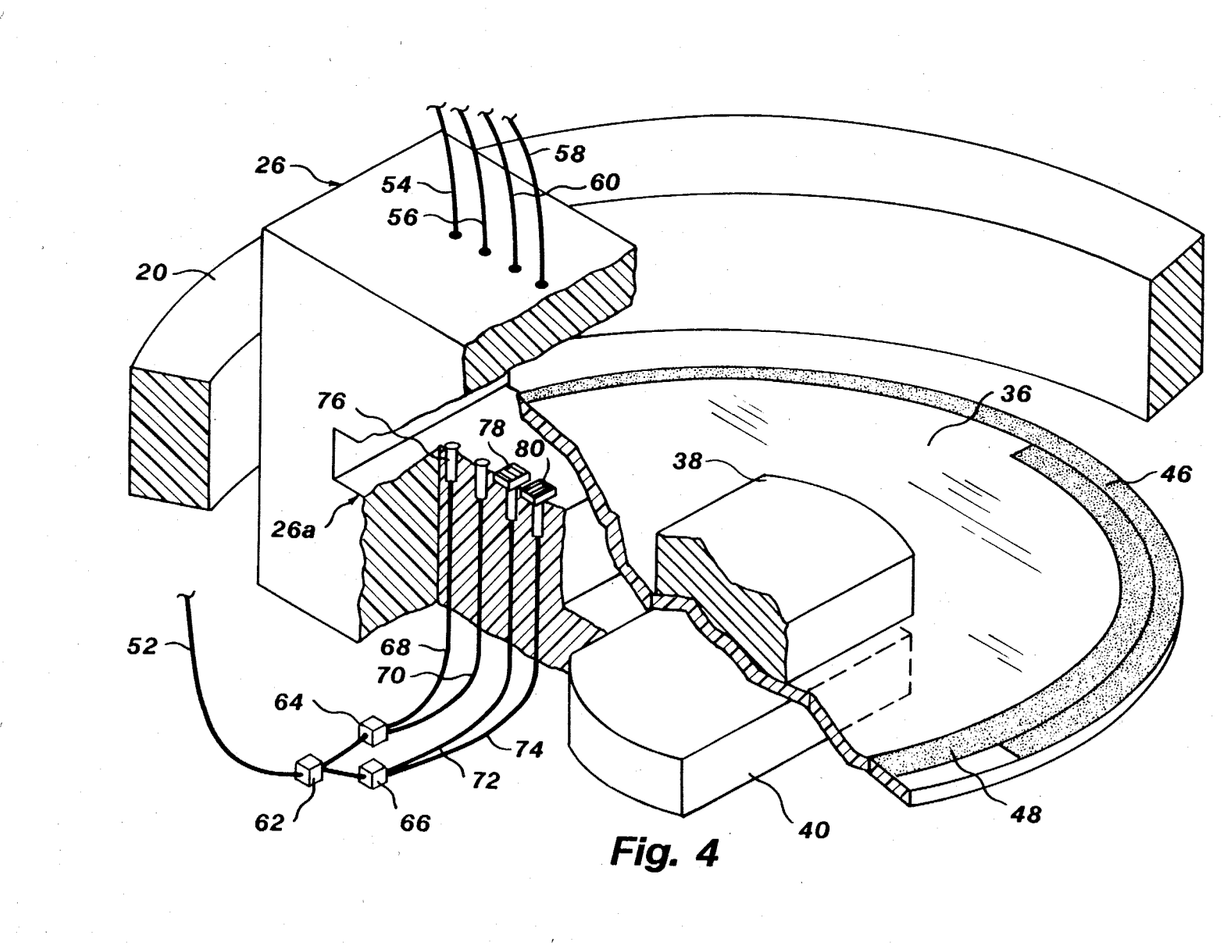
FIG. 4 is an enlarged isometric view of a portion of the compass shown in FIGS. 1, 2 and 3.

The compass may be connected to a remote station by means of an optical fiber cable 50 which contains five optical fibers; a primary transmission fiber 52 and four return fibers 54, 56, 58 and 60. The cable 50 passes through the wall of the compass body 10. Light is generated at the remote station and is transmitted to the compass by means of the primary transmission fiber 52. Light may be generated at the remote station by any suitable means, although it is considered that light emitting diodes (LED's) or laser diodes are the most effective means for this purpose. The light beam in fiber 52 is divided into four substantially equal light beams by means of three commercially available evanescent wave couplers 62, 64 and 66. Each wave coupler operates to divide the beam into two equal beams, so by utilizing three couplers disposed as shown the original beam is divided into four equal beams. Referring now particularly to FIG. 4, the four light beams are transmitted from the wave couplers 64 and 66 by means of four excitation optical fibers 68, 70, 72 and 74, which are embedded in and pass through the inner gimbal 26 so as to terminate at the lower surface of the slot 26a in the inner gimbal 26. Each of the fibers is terminated with a graded refractive index rod, only one of which is identified by the numeral 76. The graded index rods are all identical, are commercially available, and operate to collimate the beam emitted from the end of the attached fiber.

The four fibers 68-74 open onto the lower surface of the slot 26a at positions which correspond to four different radii of the disk 36. Specifically, the fiber 68 is positioned such that light emitted from the fiber 68 is directed onto the underside of the disk at a radius which is centered on the first opaque strip 46. The fiber 70 is positioned slightly closer to the center of the disk, such that light from fiber 70 is directed onto the disk 36 at a radius which corresponds with the second opaque strip 48.

The remaining two fibers 72 and 74 open onto the lower surface of the slot 26a at positions which are progressively closer to the center of the disk. The ends of the graded index rods which terminate the fibers 72 and 74 are covered by small fixed sheet polarizers 78 and 80, respectively (FIG. 4). The fixed sheet polarizers 78 and 80 are oriented with their optical axes orthogonal to one another, as represented by the schematic striations in FIG. 4, and with the optical axis of the polarizer 78 oriented so as to extend parallel to the longitudinal axis of the inner gimbal 26.

Light which is emitted by the fibers 68-74 and transmitted through the disk 36 is received by the four return fibers 54-60, respectively. The latter fibers are embedded in the upper portion of the inner gimbal 26 so as to terminate at and open onto the upper surface of the slot 26a at positions which are aligned respectively with the ends of the excitation fibers 68-74. The ends of the return fibers 54-60 are provided with graded index rods to enhance collection of the light beams transmitted through the disk 36.

It will be noted that all of the optical fibers connected to the inner gimbal 26 are provided with excess length so as to provide sufficient flexibility to accommodate the range of motion of the gimbals relative to the case 10.

The intensity of the beams received in the return fibers 58 and 60 may be measured at a remote station, for example, with photodiodes. Photodiodes are preferred for this purpose because they are characterized by a constant sensitivity over approximately ten decades of light intensity. Suitable photodiodes include those commercially available from Hewlett-Packard Corp. under the identification number 5082-4207.

Figure 5:
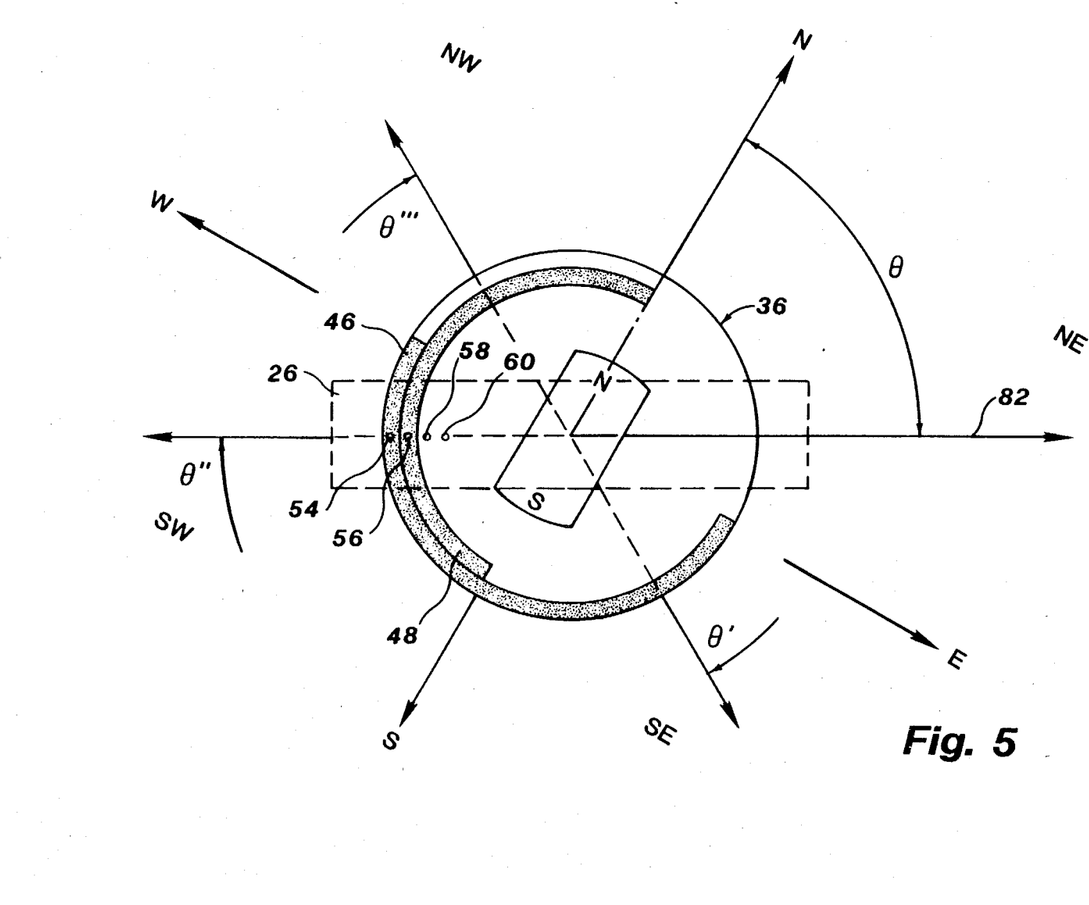
FIG. 5 is a plan view of the compass disk and gimbal, illustrating the general operation of the compass.

The operation of the compass will be described with particular reference to FIGS. 4 and 5. The intensities of the incoming light beams in the two excitation fibers 72 and 74 are substantially equal. These beams are polarized in transverse directions as a consequence of being directed through the respective fixed polarizing sheets 78 and 80 prior to being directed onto the polarizing disk 36. The light beams directed onto the disk from the two fibers 68 and 70, which are not polarized, are also substantially equal as a consequence of the four beams being derived by two successive divisions of a single beam.

As is well known from optical physics, the intensity of each of the beams transmitted through the disk 36 from fibers 72 and 74 is proportional to the square of the cosine of the angle between the optical axis of the polarizing disk 36 and the optical axis of the respective fixed polarizing sheets 78 and 80. Since the fixed polarizing sheets 78 and 80 are oriented with their optical axes orthogonal to one another and respectively parallel to and orthogonal to the longitudinal axis of the inner gimbal 26, and because the optical axis of the disk 36 is parallel to the north-south axis of the magnets, it follows that the ratio of the intensities of the beams passing through the disk is equal to the square of the tangent of the angle $\theta$ between the longitudinal axis of the inner gimbal 26 and the north-south axis of the magnets 38 and 40. This relationship is given by the equation:

$$(I_{60}/I_{58}) = \tan^2\theta$$

where $I_{58}$ and $I_{60}$ represent the intensities of the light beams received in the return fibers 58 and 60, respectively.

However, the above equation has four possible solutions. That is, although an angle $\theta$ between the N-S axis of the magnets and the longitudinal axis of the inner gimbal 26 can be determined from the ratios of the beam intensities in fibers 58 and 60 according to the above equation, this information alone is not sufficient to establish which of the four possible compass quadrants (NE, NW, SE or SW) the compass points to, as there are four possible compass directions which will satisfy the equation. In this regard, the compass direction is taken as a direction along the longitudinal axis of the inner gimbal 26. This direction is arbitrarily selected, and in the illustrated embodiment is taken as the direction along the longitudinal axis of the inner gimbal which extends away from the end of the gimbal opposite the optical fibers, as shown by the arrow 82 in FIG. 5. Thus, for a given intensity ratio in fibers 58 and 60 which has a solution the angle $\theta$, the true magnetic direction of the compass, as indicated by the angle of the longitudinal axis 82 of the inner gimbal 26 with respect to magnetic north, could be any one of the angles $\theta$; $\theta'=180°-\theta$; $\theta''=180°+\theta$; or $\theta'''=360°-\theta$ (see FIG. 5).

This ambiguity is resolved by the beams received in fibers 54 and 56, which are either occluded or transmitted depending on the positions of the semicircular opaque strips 46 and 48. Referring to FIG. 5, for example, there are shown the four possible compass directions ($\theta$, $\theta'$, $\theta''$ and $\theta'''$) in which the compass may be pointing which will give rise to an angle that is a solution to the above equation. These four possible angles are determined as described above. By next observing that the light beam from fiber 68 is occluded by the opaque strip 46 and thus not received in fiber 54; and by also observing that the light beam from fiber 70 is occluded by the opaque strip 48 and thus not received in fiber 56, it can be unequivocally concluded that the longitudinal axis 82 of the inner gimbal 26 is pointed in the north-east quadrant, and it can thus be deducted that the true direction of the compass (uncorrected for local magnetic declination) is in fact the angle $\theta$.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A remotely readable compass, comprising:
   a magnet rotatably mounted in a compass body so as to be freely rotatable with respect to said compass body, a rotatable sheet polarizer affixed to said magnet so as to be rotatable with respect to said compass body with said magnet about a common axis of rotation;
   first and second excitation optical fibers affixed to said compass body and terminating adjacent said rotatable sheet polarizer so as to direct light propagated through said fibers onto said rotatable sheet polarizer, and first and second return optical fibers affixed to said compass body and positioned respectively opposite said rotatable sheet polarizer from said excitation fibers, so as to receive light which is emitted from said first and second excitation fibers and transmitted through said rotatable sheet polarizer; and
   first and second fixed sheet polarizers, said first fixed sheet polarizer being affixed to said compass body so as to be optically interposed between said first excitation fiber and said first return fiber, said second fixed sheet polarizer being affixed to said compass body so as to be interposed between said second excitation fiber and said second return fiber, said fixed sheet polarizers having optical axes which are oriented substantially orthogonally with respect to one another;
   whereby the orientation of said magnet with respect to said compass body can be determined by transmitting two light beams through said excitation fibers, through said fixed sheet polarizers and through said rotatable sheet polarizer, and measuring the ratio of the intensities of the resulting light beams received in said return fibers.

2. The remotely readable compass defined in claim 1 wherein said rotatable sheet polarizer includes first and second semicircular opaque strips, each of said strips being geometrically centered on said axis of rotation of said magnet and said rotatable sheet polarizer, said strips being disposed at different radii from said axis of rotation, said strips extending through a circumferential angle of approximately 180° and being offset from one another circumferentially by an angle of approximately 90°; and
   further comprising third and fourth excitation optical fibers affixed to said compass body and terminating adjacent said rotatable sheet polarizer so as to direct light emitted therefrom onto said sheet polarizer at radii corresponding respectively to the radii of said first and second opaque strips, and third and fourth return optical fibers affixed to said compass body opposite said rotatable sheet polarizer respectively from said third and fourth excitation fibers and positioned so as to receive light emitted from said third and fourth excitation fibers and transmitted through said rotatable sheet polarizer;
   whereby by determining the transmission or occlusion by said rotatable sheet polarizer of light emitted by said third and fourth excitation fibers the quadrant in which said magnet and said rotatable sheet polarizer are oriented may be unequivocally determined.

3. The remotely readable compass defined in claim 2 wherein said compass body comprises an inner gimbal rotatably mounted inside an outer gimbal, and with said outer gimbal being rotatably mounted inside a compass case, with said inner gimbal and said outer gimbal having axes of rotation which are substantially orthogonal to one another, whereby said rotatable sheet polarizer and said magnet are free to rotate with two degrees of freedom with respect to said compass case.

4. The remotely readable compass defined in claim 3 wherein said compass case if filled with a liquid to damp motion of said magnet, and further comprising a float and a counterweight affixed to upper and lower sides respectively of said inner gimbal, so as to maintain said inner gimbal and said magnet and said rotatable sheet polarizer in a generally level orientation despite modest departures of the orientation of said compass case from an upright orientation.

5. The remotely readable compass defined in claim 2 wherein said rotatable sheet polarizer has an optical axis oriented parallel to the north-south axis of said magnet, and wherein said first and second sets of excitation and return fibers are positioned so as to direct light onto said rotatable sheet polarizer at first and second positions which lie on a common radius line extending from said axis of rotation of said rotatable sheet polarizer but at different radii along said radius line, and wherein said first and second fixed sheet polarizers have optical axes which are oriented so as to extend in directions which are respectively parallel to and orthogonal to said radius line.

6. The remotely readable compass defined in claim 2 wherein each optical fiber is terminated with a graded index rod.

7. The remotely readable compass defined in claim 2 further comprising a set of three evanescent wave couplers and a single primary excitation optical fiber, said three wave couplers being disposed and being coupled to said primary excitation fiber and to said first through fourth excitation fibers, so as to divide a single light beam in said primary excitation fiber into four substantially equal light beams for transmission through said first through fourth excitation optical fibers.

8. The remotely readable compass defined in claim 4 further comprising a set of three evanescent wave couplers and a single primary excitation optical fiber, said three wave couplers being disposed and being coupled to said primary excitation fiber and to said first through fourth excitation fibers so as to divide a single light beam in said primary excitation fiber into four substantially equal light beams for transmission through said first through fourth excitation optical fibers.

* * * * *